United States Patent
Mou et al.

(10) Patent No.: US 11,801,481 B2
(45) Date of Patent: Oct. 31, 2023

(54) METHODS OF FABRICATING POROUS MEMBRANE

(71) Applicant: NATIONAL TAIWAN UNIVERSITY, Taipei (TW)

(72) Inventors: Chung-Yuan Mou, Taipei (TW); Jingling Yang, Taipei (TW); Kuo-Lun Tung, Taipei (TW); Geng-Sheng Lin, Taipei (TW)

(73) Assignee: NATIONAL TAIWAN UNIVERSITY, Taipei (TW)

( * ) Notice: Subject to any disclaimer, the term of this patent is extended or adjusted under 35 U.S.C. 154(b) by 0 days.

(21) Appl. No.: 17/846,323

(22) Filed: Jun. 22, 2022

(65) Prior Publication Data
US 2022/0331747 A1   Oct. 20, 2022

Related U.S. Application Data (63) Continuation of application No. 16/522,928, filed on Jul. 26, 2019, now abandoned.
(Continued)

(51) Int. Cl.
*B01D 71/02* (2006.01)
*B01D 71/34* (2006.01)
(Continued)

(52) U.S. Cl.
CPC ........... *B01D 71/027* (2013.01); *B01D 71/34* (2013.01); *B01D 71/36* (2013.01); *B01D 71/40* (2013.01);
(Continued)

(58) Field of Classification Search
None
See application file for complete search history.

(56) References Cited

U.S. PATENT DOCUMENTS

2016/0282274 A1   9/2016   Mou et al.

FOREIGN PATENT DOCUMENTS

| CN | 101974509 B | 5/2012 |
| CN | 102923641 B | 3/2015 |

OTHER PUBLICATIONS

Liu, et al., "Mesoporous silica thin membranes with large vertical mesochannels for nano-based separation", Advanced materials, 2017, 29, 1702274 (Year: 2017).*
(Continued)

*Primary Examiner* — Krishnan S Menon
(74) *Attorney, Agent, or Firm* — McClure, Qualey & Rodack, LLP (57) ABSTRACT

Methods of fabricating a porous membrane are disclosed. The first method includes the following operations. A mesoporous silica thin film with perpendicular mesopore channels is grown on a polymer film. The mesoporous silica thin film and the polymer film are transferred onto a macroporous substrate, in which the polymer film is positioned between the macroporous substrate and the mesoporous silica thin film. The polymer film is removed to form the porous membrane. The second method includes the following operations. A polymer film is formed on a macroporous substrate, wherein the polymer film includes crosslinked polymers including cross-linked polystyrene, cross-linked polymethyl methacrylate, or a combination thereof. A mesoporous silica thin film with perpendicular mesopore channels is grown on the polymer film. The polymer film is removed to form the porous membrane.

19 Claims, 11 Drawing Sheets

Related U.S. Application Data (60) Provisional application No. 62/718,382, filed on Aug. 14, 2018, provisional application No. 62/718,355, filed on Aug. 13, 2018.

(51) Int. Cl.
| | | |
|---|---|---|
| *B01D 71/40* | (2006.01) | |
| *B01D 71/54* | (2006.01) | |
| *B01D 71/36* | (2006.01) | |
| *H01M 4/38* | (2006.01) | |
| *H01M 10/0525* | (2010.01) | |
| *H01M 10/0562* | (2010.01) | |
| *H01M 10/0565* | (2010.01) | |
| *B82Y 30/00* | (2011.01) | |

(52) U.S. Cl.
CPC ............ *B01D 71/54* (2013.01); *H01M 4/386* (2013.01); *H01M 10/0525* (2013.01); *H01M 10/0562* (2013.01); *H01M 10/0565* (2013.01); *B01D 2325/02* (2013.01); *B01D 2325/04* (2013.01); *B82Y 30/00* (2013.01)

(56) References Cited

OTHER PUBLICATIONS

Jingling Yang et al, Diatom-Mimicking Ultrahigh-Flux Mesoporous Silica Thin Membrane with Straight-Through Channels for Selective Protein and Nanoparticle Separations, Chemistry of Materials, published on Mar. 12, 2019, p. A-G, vol. 31, Issue 5, ACS Publications, U.S.A.

Self-assembly of a silica-surfactant nancomposite in a porous alumina membrane, Yamaguchi et al, Nat mater, May 2004;3(5): 337-41.

"Synthesis and Nanfiltration Membrane Performance of Oriented Mesoporous Silica Thin Films on Macroporous Supports;" Wooten et al, 21806 ACS Appl. Mater. Interfaces 2016, 8, 21806-21815.

\* cited by examiner

METHODS OF FABRICATING POROUS MEMBRANE

CROSS-REFERENCE TO RELATED APPLICATION

The present application is a continuation of U.S. application Ser. No. 16/522,928, filed Jul. 26, 2019, which claims priority to U.S. Provisional Application Ser. No. 62/718,355, filed Aug. 13, 2018, and U.S. Provisional Application Ser. No. 62/718,382, filed Aug. 14, 2018. All of these applications and patents are incorporated herein by reference in their entireties.

BACKGROUND

Field of Invention

The present disclosure relates to methods of fabricating a porous membrane. More particularly, the present disclosure relates to methods of fabricating a porous membrane including a macroporous substrate and a mesoporous silica thin film (MSTF) positioned thereon.

Description of Related Art

Recently, well-defined mesoporous thin membranes with pore diameters of 2 to 50 nm have attracted growing interest and wide applications, such as membrane-based purification and chromatography systems that require highly efficient separations. In nanofiltration, ultrasmall nanochannels in the pore size range of 1 to 10 nm are especially required for artificial membranes to achieve molecule-level separation. However, the common commercial nanoporous membranes generally exhibit random structure pores, tortuous pore paths, wide pore size distribution, and are relatively thick, thus with unsatisfactory liquid flux.

Therefore, membranes with large-scale perpendicular nanochannels are eagerly demanded to achieve efficient nanofiltration ability.

SUMMARY

The present disclosure provides a method of fabricating a porous membrane. The method including the following operations. A mesoporous silica thin film with perpendicular mesopore channels is grown on a polymer film. After growing the mesoporous silica thin film, the mesoporous silica thin film and the polymer film is transferred onto a macroporous substrate, in which the polymer film is positioned between the macroporous substrate and the mesoporous silica thin film. The polymer film is removed to form the porous membrane.

In some embodiments, the polymer film includes polyvinylidene fluoride (PVDF).

In some embodiments, the polymer film is removed by N-methyl-pyrrolidone (NMP) and an ozone clean.

In some embodiments, the method further includes before growing the mesoporous silica thin film, spin coating a PVDF solution on a glass sheet; and evaporating a solvent in the PVDF solution to form the polymer film.

In some embodiments, growing the mesoporous silica thin film with the perpendicular mesopore channels on the polymer film includes the following operations. The polymer film is immersed into an ammonia solution, in which the ammonia solution includes a tertiary alkyl ammonium halide, ammonium hydroxide, alcohol, and a pore expending agent. A silica precursor is introduced into the ammonia solution. A heating step is performed to form the mesoporous silica thin film on the polymer film.

In some embodiments, the pore expending agent is selected from the group consisting of decane, ethyl acetate, hexadecane, silane polyethylene glycol, pentyl ether, and a combination thereof.

In some embodiments, the silica precursor includes tetraethyl orthosilicate, fumed silica, zeolite beta seeds, or a combination thereof.

In some embodiments, the tertiary alkyl ammonium halide is cetyltrimethylammonium bromide (CTAB).

In some embodiments, the heating step is performed at a temperature between about 35° C. and about 80° C.

In some embodiments, the macroporous substrate has macropores, and the macropores have an average pore diameter of more than or equal to about 20 nm, and less than or equal to about 1 µm.

In some embodiments, the mesoporous silica thin film has an area of more than or equal to about 0.5 cm$^2$, and less than or equal to about 100 cm$^2$.

In some embodiments, each mesopore channel of the mesoporous silica thin film has a pore size of more than or equal to about 2 nm, and less than or equal to about 10 nm.

The present disclosure provides a method of fabricating a porous membrane. The method including the following operations. A polymer film is formed on a macroporous substrate, in which the polymer film includes cross-linked polymers including cross-linked polystyrene (PS), cross-linked polymethyl methacrylate (PMMA), or a combination thereof. A mesoporous silica thin film with perpendicular mesopore channels is grown on the polymer film. The polymer film is removed to form the porous membrane.

In some embodiments, forming the polymer film on the macroporous substrate includes: coating a solution includes polymers and a photoinitiator on the macroporous substrate, in which the polymers include polystyrene (PS), polymethyl methacrylate (PMMA), or a combination thereof; and irradiating the solution with UV light to form the crosslinked polymers to form the polymer film.

In some embodiments, the polymer film is removed by a heat treatment and an ozone clean.

In some embodiments, the heating treatment is performed at a temperature between about 300° C. and about 500° C.

In some embodiments, the macroporous substrate has macropores, and the macropores have an average pore diameter of more than or equal to about 20 nm, and less than or equal to about 1 µm.

In some embodiments, the mesoporous silica thin film has an area of more than or equal to about 0.5 cm$^2$, and less than or equal to about 100 cm$^2$.

In some embodiments, the mesoporous silica thin film has a thickness of more than or equal to about 10 nm, and less than or equal to about 100 nm.

In some embodiments, each mesopore channel of the mesoporous silica thin film has a pore size of more than or equal to about 2 nm, and less than or equal to about 10 nm.

It is to be understood that both the foregoing general description and the following detailed description are by examples, and are intended to provide further explanation of the invention as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Reference will now be made in detail to the present embodiments of the, examples of which are illustrated in the accompanying drawings. Wherever possible, the same reference numbers are used in the drawings and the description to refer to the same or like parts.

The following embodiments are disclosed with accompanying diagrams for detailed description. For illustration clarity, many details of practice are explained in the following descriptions. However, it should be understood that these details of practice do not intend to limit the present disclosure. That is, these details of practice are not necessary in parts of embodiments of the present disclosure. Furthermore, for simplifying the drawings, some of the conventional structures and elements are shown with schematic illustrations.

Figure 1:
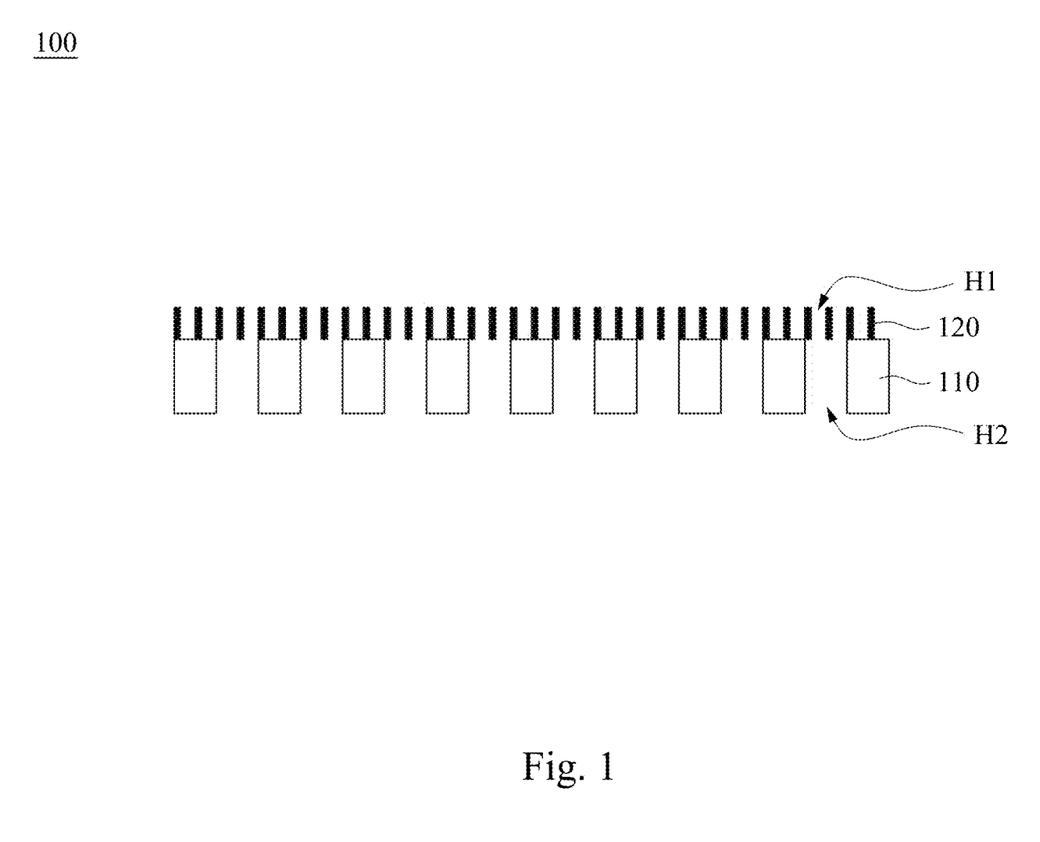
FIG. 1 shows a cross-sectional view of a porous membrane according to various embodiments of the present disclosure.
Figure 2A:
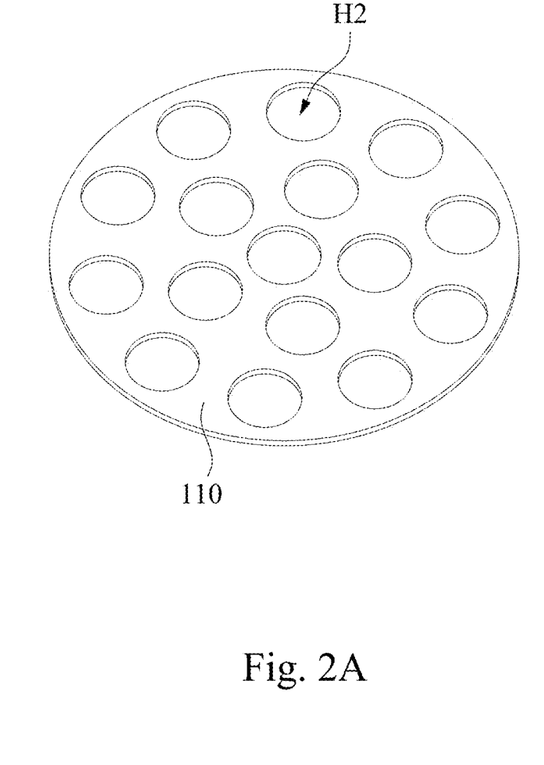
FIG. 2A shows the macroporous substrate in FIG. 1 according to various embodiments of the present disclosure.
Figure 2B:
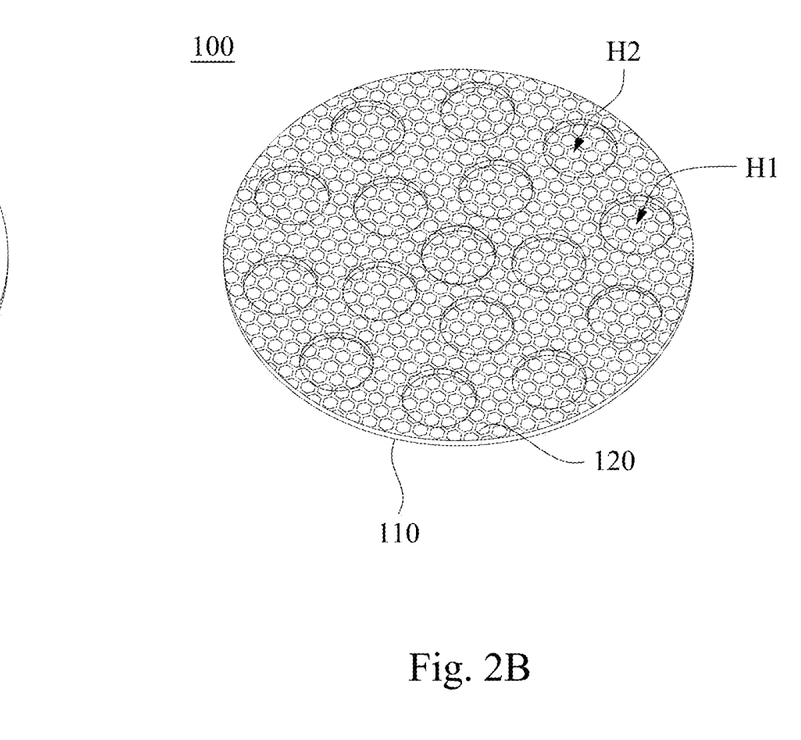
FIG. 2B shows the porous membrane in FIG. 1 according to various embodiments of the present disclosure.

One aspect of the present disclosure provides a porous membrane including a macroporous substrate and a mesoporous silica thin film (MSTF) with perpendicular mesopore channels thereon. FIG. 1 shows a cross-sectional view of a porous membrane 100 according to various embodiments of the present disclosure. The porous membrane 100 includes a macroporous substrate 110 and a mesoporous silica thin film (MSTF) 120 with perpendicular mesopore channels H1. These mesopore channels H1 are through nanochannels. The macroporous substrate 110 has macropores H2. The MSTF 120 is positioned on the macroporous substrate 110. In some embodiments, the macroporous substrate 110 is in direct contact with the MSTF 120. FIG. 2A shows the macroporous substrate 110 in FIG. 1 according to various embodiments of the present disclosure. FIG. 2B shows the porous membrane 100 in FIG. 1 according to various embodiments of the present disclosure.

In some embodiments, each mesopore channel H1 of the MSTF 120 has a pore size of more than or equal to about 2 nm, and less than or equal to about 10 nm. For example, the pore size is 2.2 nm, 2.5 nm, 3 nm, 3.7 nm, 4 nm, 5 nm, 5.4 nm, 5.9 nm, 6 nm, 7 nm, 8 nm, or 9 nm, but not limited thereto. In some embodiments, the MSTF 120 has a thickness of more than or equal to about 10 nm, and less than or equal to about 100 nm. For example, the thickness of the MSTF 120 is 30 nm, 40 nm, 50 nm, 60 nm, 70 nm, 80 nm, or 90 nm, but not limited thereto. In some embodiments, the MSTF 120 has an area of more than or equal to about 0.5 cm$^2$, and less than or equal to about 100 cm$^2$. For example, the area of the MSTF 120 is 10 cm$^2$, 20 cm$^2$, 30 cm$^2$, 40 cm$^2$, 50 cm$^2$, 60 cm$^2$, 70 cm$^2$, 80 cm$^2$, or 90 cm$^2$, but not limited thereto.

In some embodiments, the macroporous substrate 110 includes an inorganic material, a metal, a polymer, or a combination thereof. In some embodiments, the inorganic material is selected from the group consisting of aluminum oxide, zirconia, titania, magnesia, spinel, calcia, cordierite, zeolite, mullite, ferrite, zinc oxide, silicon carbide, aluminum nitride, silicon nitride, titanium carbide, tungsten carbide, barium titanate, boron carbide, kaolin, and hydroxyapatite. In some embodiments, the inorganic material includes an anodic aluminum oxide (AAO). In some embodiments, the macroporous substrate 110 is an AAO substrate. In some embodiments, the polymer is selected from the group consisting of polyvinylidene fluoride (PVDF), polyvinyl chloride (PVC), polyacrylonitrile (PAN), polymethyl methacrylate (PMMA), polyoxyethylene (PEO), polyamide (PAI), polytetrafluoroethylene (PTFE), and rubber. In some embodiments, the macropores H2 of the macroporous substrate 110 have an average pore diameter of more than or equal to about 20 nm, and less than or equal to about 1 μm. For example, the average pore diameter of the macropores H2 is 50 nm, 100 nm, 200 nm, 300 nm, 400 nm, 500 nm, 600 nm, 700 nm, 800 nm, or 900 nm, but not limited thereto. In some embodiments, the macroporous substrate 110 has a thickness of more than or equal to about 20 nm, and less than or equal to about 1 mm. For example, the thickness of the macroporous substrate 130a is 30 nm, 40 nm, 50 nm, 60 nm, 70 nm, 80 nm, 90 nm, 100 nm, 200 nm, 300 nm, 400 nm, 500 nm, 600 nm, 700 nm, 800 nm, 900 nm, or 1000 nm, but not limited thereto.

In some embodiments, the porous membrane 100 is a filter and is used for filtration, such as nanofiltration or ultrafiltration.

Another aspect of the present disclosure provides a method for filtering a fluid including particles with a porous membrane. The method includes the following step. The fluid including the particles is passed through the porous membrane, wherein the porous membrane comprises a macroporous substrate and a mesoporous silica thin film (MSTF) with perpendicular mesopore channels, and the MSTF is positioned on the macroporous substrate. The fluid may be a liquid, a gas or a supercritical fluid. The embodiments of the porous membrane used in this method can refer to the embodiments of the porous membrane 100 as mentioned previously. In some embodiments, the porous membrane has a permeation flux of more than or equal to about 300 L m$^{-2}$ h$^{-1}$ bar$^{-1}$, and less than or equal to about 1100 L m$^{-2}$ h$^{-1}$ bar$^{-1}$. For example, the permeation flux is 400, 500, 600, 700, 800, 900, or 1000 L m$^{-2}$ h$^{-1}$ bar$^{-1}$. In some embodiments, the permeation flux is 339, 413, 638, or 1027 L m$^{-2}$ h$^{-1}$ bar$^{-1}$ The porous membrane of the present disclosure has excellent size exclusion ability and high molecular-sieving ability.

In some embodiments, the particles are nanoparticles. For example, the particles are Ag nanoparticles. In some embodiments, the particles have an average size of more than 1.5 nm. In some embodiments, the particles include biomolecules, dyes, or a combination thereof, but not limited thereto. In some embodiments, the biomolecules include proteins, viruses, or a combination thereof, but not limited thereto.

Another aspect of the present disclosure provides a method of fabricating a porous membrane. The method includes the following steps. (i) A polymer film is formed on a macroporous substrate. (ii) A mesoporous silica thin film (MSTF) with perpendicular mesopore channels is grown on the polymer film. (iii) The polymer film is removed to form the porous membrane. More specifically, the porous membrane includes the macroporous substrate and the MSTF with perpendicular mesopore channels thereon. The MSTF fabricated by the method is free of cracking defects and has uniform perpendicular mesopore channels. Moreover, by this method, large area MSTF can be produced. In some embodiments, the method is used for fabricating a centimeter-size MSTF. In some embodiments, the MSTF has an area of more than or equal to about 0.5 $cm^2$, and less than or equal to about 100 $cm^2$.

In some embodiments, the polymer film is formed by synthesizing the polymer film on the macroporous substrate. For example, the polymer film is formed by the following steps. A solution including polymers and a photoinitiator is coated on the macroporous substrate. The solution is irradiated with UV light to form crosslinked polymers to form the polymer film.

In some embodiments, the polymers comprise polystyrene (PS), poly(ethylene oxide) poly(propylene oxide) poly(ethylene oxide) triblock copolymer (PEO-PPO-PEO triblock copolymer, P123), polymethyl methacrylate (PMMA), or a combination thereof. In some embodiments, the polymer film includes cross-linked polystyrene (PS), cross-linked poly(ethylene oxide) poly(propylene oxide) poly(ethylene oxide) triblock copolymer (PEO-PPO-PEO triblock copolymer, P123), cross-linked polymethyl methacrylate (PMMA), or a combination thereof.

In some embodiments, the polymer film is removed by a heat treatment and an ozone clean. In some embodiments, the heating treatment is performed at a temperature between about 300° C. and about 500° C. For example, the temperature is 350° C., 400° C. or 450° C., but not limited thereto.

In some embodiments, step (ii) is prior to step (i). More specifically, a mesoporous silica thin film with perpendicular mesopore channels is grown on a polymer film. After that, the mesoporous silica thin film and the polymer film are transferred onto the macroporous substrate, wherein the polymer film is positioned between the macroporous substrate and the mesoporous silica thin film.

In some embodiments, the polymer film includes polyvinylidene fluoride (PVDF). In some embodiments, the polymer film is removed by N-methyl-pyrrolidone (NMP) and an ozone clean.

In some embodiments, the mesoporous silica thin film with the perpendicular mesopore channels is grown on the polymer film by the following steps. (i) The polymer film is immersed into an ammonia solution, wherein the ammonia solution includes a tertiary alkyl ammonium halide, ammonium hydroxide, alcohol, and a pore expending agent. (ii) A silica precursor is introduced into the ammonia solution. (iii) A heating step is performed to form the mesoporous silica thin film on the polymer film. In some embodiments, the tertiary alkyl ammonium halide is cetyltrimethylammonium bromide (CTAB). In some embodiments, the pore expending agent is selected from the group consisting of decane, ethyl acetate, hexadecane, silane polyethylene glycol, pentyl ether and a combination thereof. In some embodiments, the silica precursor includes tetraethyl orthosilicate, fumed silica, zeolite beta seeds, or a combination thereof. In some embodiments, the heating step is performed at a temperature between about 35° C. and about 80° C. For example, the temperature is 40° C., 45° C., 50° C., 55° C., 60° C., 65° C., 70° C., or 75° C., but not limited thereto.

Hereinafter, the present disclosure will be described in detail with reference to the embodiments and comparative examples in the present disclosure. However, the present disclosure is not limited to the following embodiments.

Example 1: Synthesis of a Dual-Layer MSTF/AAO Membrane by a Polymer Interlayer Method Firstly, polystyrene (PS), PEO-PPO-PEO triblock copolymer (P123) and polymethyl methacrylate (PMMA) were respectively used to produce a smooth surface layer on aluminum oxide (AAO) membranes with macropores for further growth of mesoporous silica thin film (MSTF). PS and P123 were dissolved in toluene under 50° C. for 1 h, respectively. PMMA was dissolved in anisole. Subsequently, 0.1 wt %-1 wt % photoinitiator was well dispersed into the solutions above. These solutions were used to spin-coat the AAO membranes (2.5 cm-4.7 cm in diameter, situated on a 5×5 $cm^2$ glass sheet) at 2000 rpm for 30 s, respectively. Then the cross-linking of the polymers on AAO surface were induced by the photoinitiator under UV light irradiation for 5 min-10 min. The spin-coated PS/AAO support and PMMA/AAO support were cured under 100° C. for 1 h-2 h afterwards, while P123/AAO support was stabilized at room temperature for 1 h-2 h, respectively.

Further growth of a mesoporous silica thin film (MSTF) on the top surface of each polymer film coated AAO membrane was conducted in an oil-in-water emulsion. The oil-in-water emulsion was prepared by mixing cetyltrimethylammonium bromide (CTAB) (0.965 g), ethanol (30.0 g) and a pore expending agent (either 3.0 mL of decane, or 3.1 mL of pentyl ether, or 4.5 mL of hexadecane, or 1.2 mL of ethyl acetate, or 1.2 mL of ethyl acetate with the addition of 2.2 mL of silane polyethylene glycol) at 50° C. Then, the polymer film coated AAO membranes were directly immersed into the solution, followed by an introduction of $NH_3$ aqueous solution (7.5 g, 35.5 wt %), tetraethyl orthosilicate (TEOS)/ethanol solution (8.35 mL, 20% by volumes) under stirring at 50° C. overnight. The molar ratios of $CTAB:H_2O:NH_3$:decane:ethanol:TEOS were calculated to be 1:8400:90:5.8:250:2.8. The synthesized MSTF/polymer film/AAO membranes were rinsed with ethanol, and then calcined in air atmosphere by heating from room temperature at rate of 1° C./min to 300° C.-500° C. and maintained at this temperature for 30 min-6 h, followed by UV ozone clean for 15 min-30 min. The polymer film and surfactant (e.g. CTAB) were removed by calcination and an ozone clean. After that, porous membranes including the AAO membrane and the MSTF with perpendicular mesopore channels freely standing on the AAO membrane were obtained. The MSTF⊥AAO membranes with different pore size of MSTF are labeled as MSTF-X⊥AAO (X corresponds to the pore size).

Example 2: Synthesis of a Dual-Layer MSTF/AAO Membrane by a Polyvinylidene Fluoride (PVDF) Assistant Transfer Method Firstly, 10.0 wt % polyvinylidene fluoride (PVDF) was dissolve in acetone and dimethyl formamide mixed solution (acetone:dimethyl formamide=3:1 v/v) under the ultrasonic at 30° C. for 1 h. Then, the PVDF solution was spin-coated at 2000 rpm for 30 s on a 5×5 cm² glass sheet. Further solvent was evaporated at 60° C. for 1 h. Subsequently, MSTF was grown onto the PVDF film by the same procedures as mentioned in Example 1. Then, the synthesized MSTF/PVDF film/glass sheet was rinsed with ethanol three times. To remove the residual organic surfactants, the samples were immersing in a hydrochloric acid/ethanol (5 mg/ml, 50 mL) solution for 12 h-16 h under constant stirring, followed by washing the MSTF/PVDF film/glass sheet by ethanol, and peeling off the MSTF/PVDF film from the glass sheet. Subsequently, transfer the MSTF/PVDF film onto AAO membrane (0.1 cm-4.7 cm in diameter). Finally, the PVDF film in MSTF/PVDF film/AAO membrane was removed by N-methyl-pyrrolidone (NMP), follow by UV ozone clean for 15 min-30 min to remove the PVDF film and the organics. After that, a porous membrane which includes the AAO membrane and the MSTF with perpendicular mesopore channels freely standing on the AAO membrane was obtained. The MSTF⊥AAO membranes with different pore size of MSTF are labeled as MSTF-X⊥AAO (X corresponds to the pore size).

Example 3: Characterization of a Dual-Layer MSTF AAO Membrane by Scanning Electron Microscope (SEM)

Top-view and edge-view micrographs were taken on a field emission scanning electron microscope (SEM) (Hitachi S-4800) operated at accelerating voltages of 5 kV and 15 kV, respectively. The samples were loaded onto a plate holder with conducting carbon tape adhered at the bottom and silver paint coated at the edges of membranes. The whole specimen was baked at 80° C. overnight prior to SEM imaging.

Figure 3A:
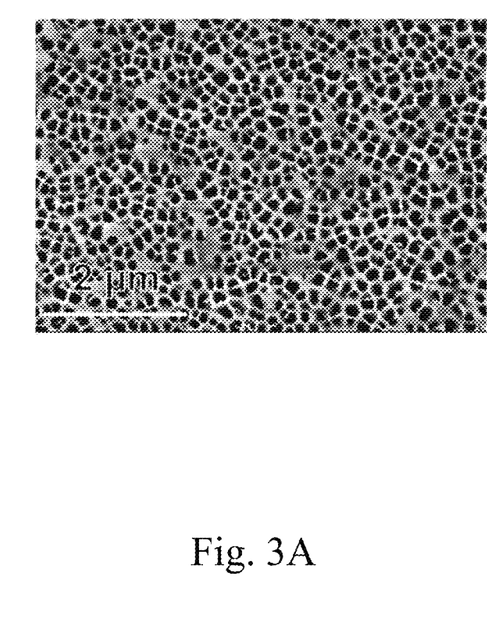
FIGS. 3A-3B respectively show top-view scanning electron microscopy (SEM) images of a single-layer AAO membrane.
Figure 3B:
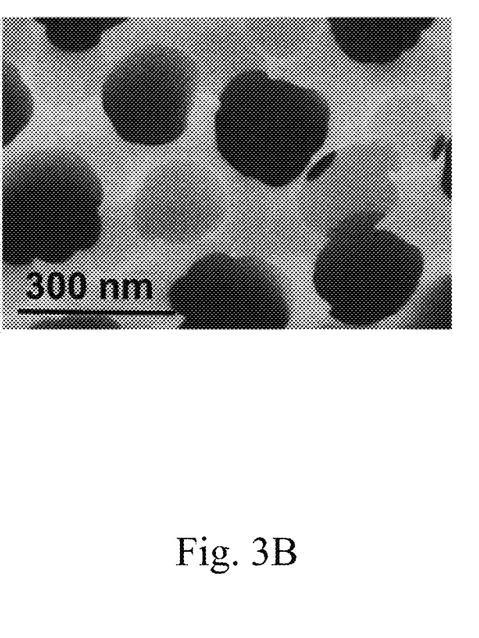
Figure 4A:
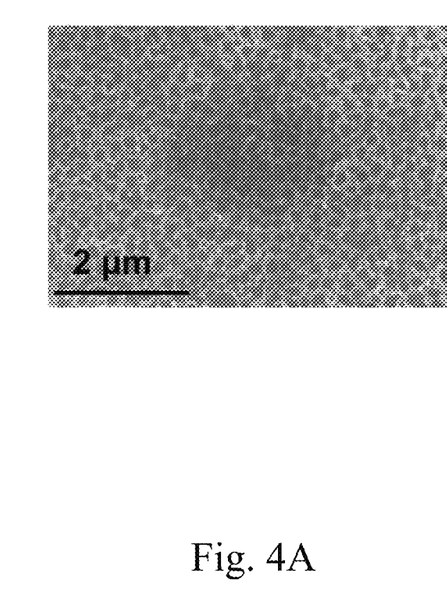
FIGS. 4A-4C respectively show top-view SEM images of a dual-layer MSTF-5.9 AAO membrane.
Figure 4B:
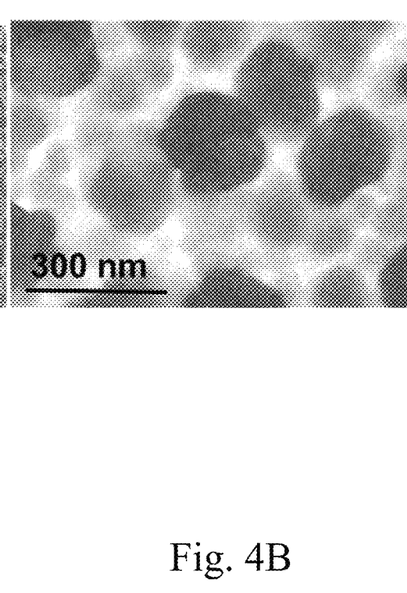
Figure 4C:
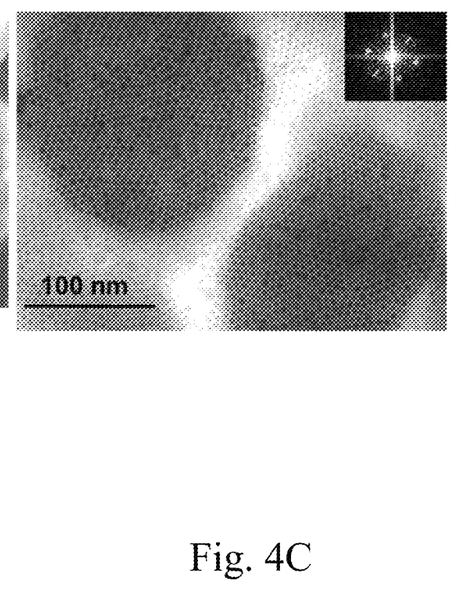
Figure 5:
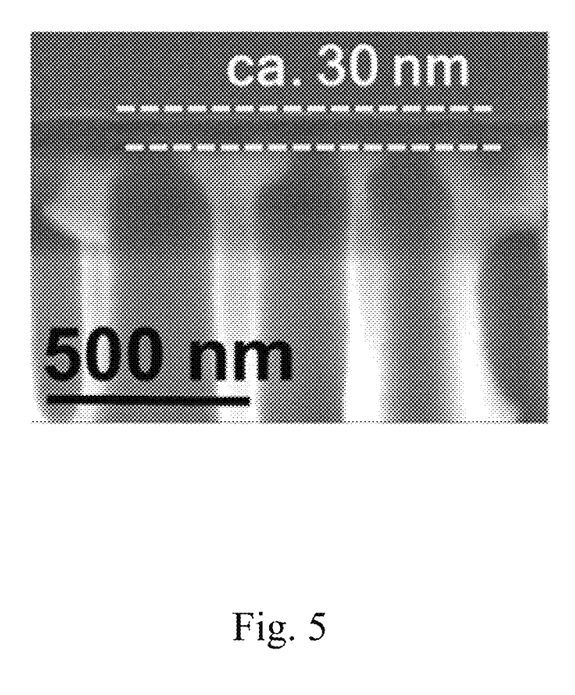
FIG. 5 shows a side-view SEM image of a dual-layer MSTF-5.9⊥AAO membrane.
Figure 6A:
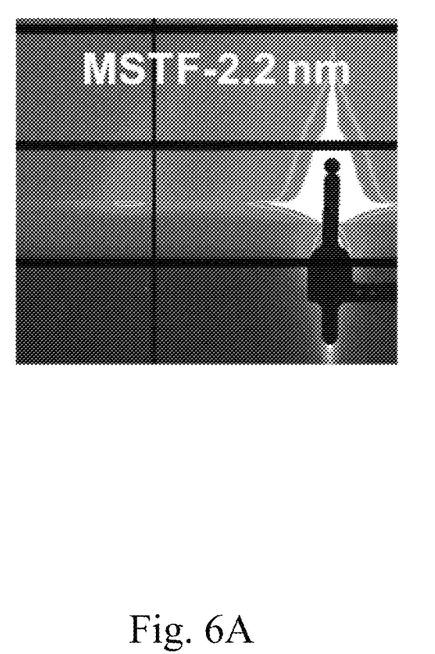
FIGS. 6A-6D respectively show 2D grazing-incidence small-angle X-ray scattering (GISAXS) scattering profile of MSTF-2.2, MSTF-2.5, MSTF-3.7 and MSTF-5.9.
Figure 6B:
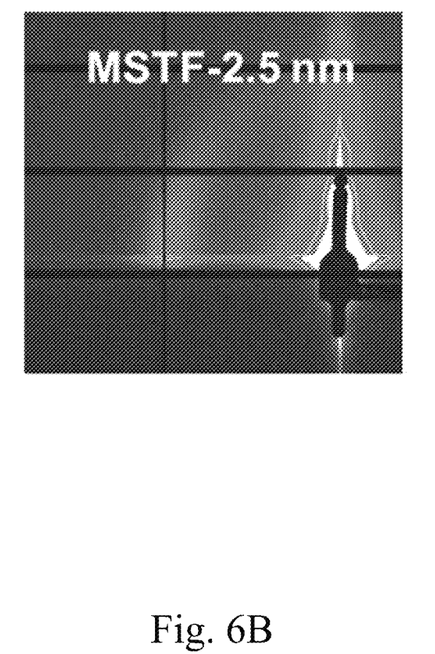
Figure 6C:
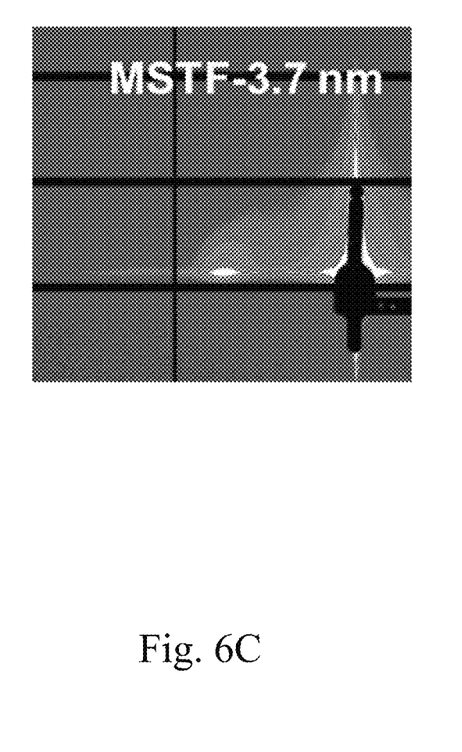
Figure 6D:
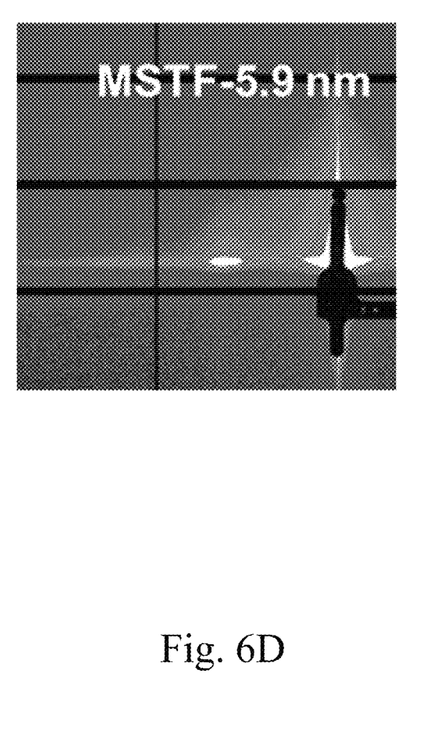

FIGS. 3A-3B respectively show top-view scanning electron microscopy (SEM) images of a single-layer AAO membrane. FIGS. 4A-4C respectively show top-view SEM images of a dual-layer MSTF-5.9⊥AAO membrane. The top-view SEM images of the single-layer AAO membrane (FIGS. 3A, 3B) and the top-view SEM images of the dual-layer MSTF-5.9⊥AAO membrane (FIGS. 4A-4C) confirm that the continuous regime of the thin film of mesoporpous silica of MSTF-5.9⊥AAO showed no apparent defects. Centimeter-size thin film of mesoporpous silica in MSTF-5.9⊥AAO can be routinely prepared with optically uniformity. A magnified top-view SEM image (FIG. 4C) reveals the single-layer MSTF with hexagonally arranged nanopores cover on both the wall and macrospore of AAO membrane. A side-view SEM image (FIG. 5) of the MSTF-5.9⊥AAO reveals AAO with uniform perpendicular channels (thickness of 60 μm), while MSTF with uniform thickness of about 30 nm.

Example 4: Characterization of a Dual-Layer MSTF/AAO Membrane by Grazing Incidence Small Angle X-Ray Scattering (GISAXS)

The incidence X-ray energy of 12 keV (1.033 Å) and the sample-to-detector distance of 3.10 m result in a q-range of 0.005540-0.2853 Å$^{-1}$ that is equivalent to real space distance of 2.2-113 nm. The incidence angle of each X-ray beam varied between 0.1 and 0.3°. The scattering data extraction was performed in an X-ray scattering image analysis package (POLAR). Alternatively, in-house scattering was conducted by a grazing-incidence geometry (Nano-Viewer, Rigaku) with a two dimensional (2D) area detector (Rigaku, 100K PILATUS). The instrument is equipped with a 31 kW mm$^{-2}$ generator (rotating anode X-ray source with a Cu Kα radiation of λ=0.154 nm). The scattering vector, q (q=4π/λ sin θ), along with the scattering angles θ in these patterns were calibrated using silver behenate. The mesoporous silica thin film with perpendicular nanochannels were mounted on a z-24 axis goniometer with an incident angle of 0.1-0.3°.

Figure 7:
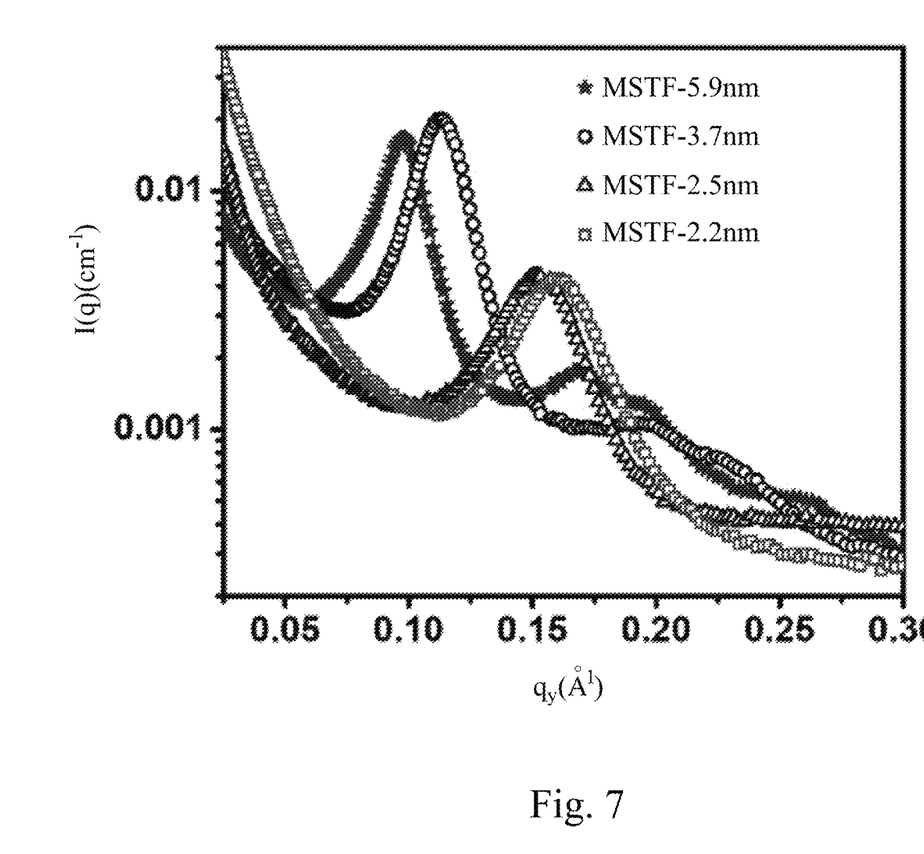
FIG. 7 shows 1D intensity profile plotted against $q_y$ for the GISAXS pattern of MSTF-2.2, MSTF-2.5, MSTF-3.7 and MSTF-5.9.

The perpendicular mesopore channels over the entire MSTF membranes with different pore size were further characterized by grazing-incidence small-angle X-ray scattering (GISAXS). FIGS. 6A-6D respectively show 2D GISAXS scattering profile of MSTF-2.2, MSTF-2.5, MSTF-3.7 and MSTF-5.9. As shown in FIGS. 6A-6D, the 2D GISAXS patterns show prominent spots on the left of the grazing-incidence X-ray beam. These indicate the highly ordered vertical nanochannel features of mesoporous thin films. FIG. 7 shows 1D intensity profile plotted against $q_y$ for the GISAXS pattern of MSTF-2.2, MSTF-2.5, MSTF-3.7 and MSTF-5.9. The 1D intensity profiles of these MSTF show significant peaks located at different $q_y$ positions, and reflect the 2D hexagonal symmetry with the space group p6 mm, as well as evidence the perpendicular orientation of MSTF above substrates. The (100) peak of MSTF-5.9 is found to correspond with an averaged d-spacing of 6.87 nm, account for a pore to pore center distance of 7.94 nm, which agrees with the SEM results (FIG. 4C) with average pore size of about 5.9 nm and pore walls sizes of about 2.0 nm. Meanwhile, the average pore sizes of MSTF-3.7, MSTF-2.5 and MSTF-2.2 nm were about 3.7 nm, 2.5 nm, and 2.2 nm, respectively.

Example 5: Flux Measurement of the Dual-Layer MSTF⊥AAO Membranes

Pressure-driven separation was carried out using a dead-end filtration device under a pressure of 7 kPa at room temperature. The effective permeation area of the filter was 12.6 cm². Pure water flux (Jw, in L m$^{-2}$ h$^{-1}$ bar$^{-1}$) was used to evaluate the permeation performance of the MSTF-⊥LAAO membranes.

Figure 8:
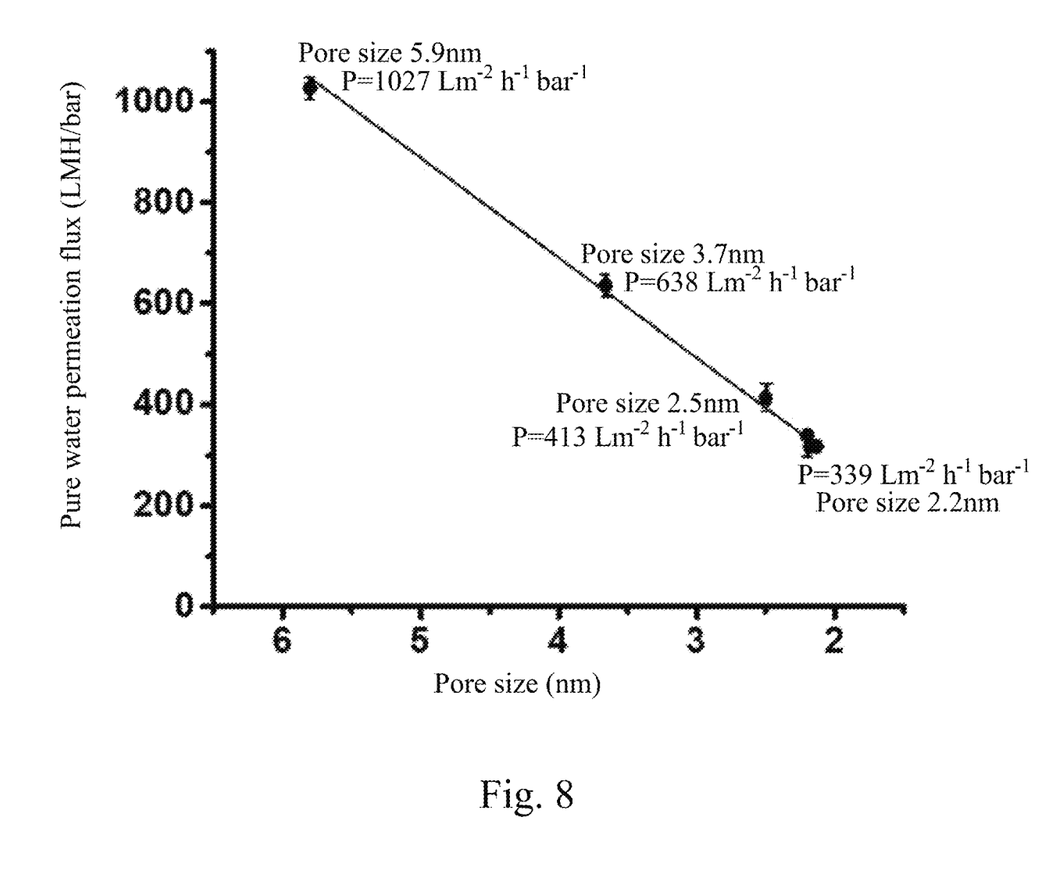
FIG. 8 shows the corresponding permeation fluxes of the MSTF⊥AAO membranes with different pore sizes.

The effectiveness of the dual-layer MSTF AAO membrane filter for separating nanosize-based proteins was evaluated using a dead-end filtration device. FIG. 8 shows the corresponding permeation fluxes of the MSTF⊥LAAO membranes with different pore sizes. P represents the permeation flux. The permeation fluxes were tested with pure water. It should be noted that all permeation fluxes were found to be larger than 339 L m$^{-2}$ h$^{-1}$ bar$^{-1}$ and even reached 1027 L m$^{-2}$ h$^{-1}$ bar$^{-1}$, which is significantly higher than the permeances of reported works.

Example 6: Use of a Dual-Layer MSTF-5.9⊥AAO Membrane as a Filter for Size-Exclusion Ultrafiltration To demonstrate the high molecular-sieving ability of the MSTF-5.9⊥AAO membrane with pore diameter of 5.9 nm, ultrafiltration of proteins was performed using the dead-end filtration device as mentioned in Example 5 under the same permeation conditions. Ten milliliters of a solution was placed into a filtration device equipped with a membrane filter. The solution that permeated through the thin membrane was collected. The concentration changes in the protein solutions before and after the filtration were determined by UV-vis absorption spectroscopy (Hitachi U-3310). The separation performance was evaluated based on the amount of the protein present in the permeate and the original (feed) solution. The feed solutions of proteins with different molecular weights (MWs) and sizes were selected, such as bovine serum albumin (BSA) (67 kDa, 7 nm), ovalbumin (OVA) (43 kDa, 5 nm), lysozyme (LYZ) (14 kDa, 3 nm), and cytochrome c (Cyt c) (12 kDa, 2 nm). The concentration changes of the protein solutions before and after the filtration were determined by UV-vis absorption spectroscopy, respectively. The summary results are shown in the following Table 1. Table 1 shows ultrafiltration results of various proteins using MSTF-5.9⊥AAO and bare AAO membranes.

TABLE 1

| Proteins | kDa | Size (nm) | AAO rejection (%) | MSTF-5.9⊥AAO rejection (%) |
|---|---|---|---|---|
| Bovine Serum Albumin | 67 | 7 | 29.6 | 99.6 |
| Ovalbumin | 43 | 5 | 3.1 | 57.1 |
| Lysozyme | 14 | 3 | 2.6 | 29.1 |
| Cytochrome c | 12 | 2 | 0.6 | 10.4 |

MSTF-5.9⊥AAO achieved 99.6% rejection of BSA, 57.1% rejection of OVA, 29.1% rejection of LYZ, and 10.4% rejection of Cyt c. The results indicate that more than 70.9% of LYZ and 89.6% of Cyt c passed through the biomimetic MSTF-5.9⊥AAO membrane, while BSA was completely rejected. The results demonstrate that the MSTF-5.9⊥AAO membrane exhibits excellent selectivity for the separation of proteins with different MWs.

Figure 9:
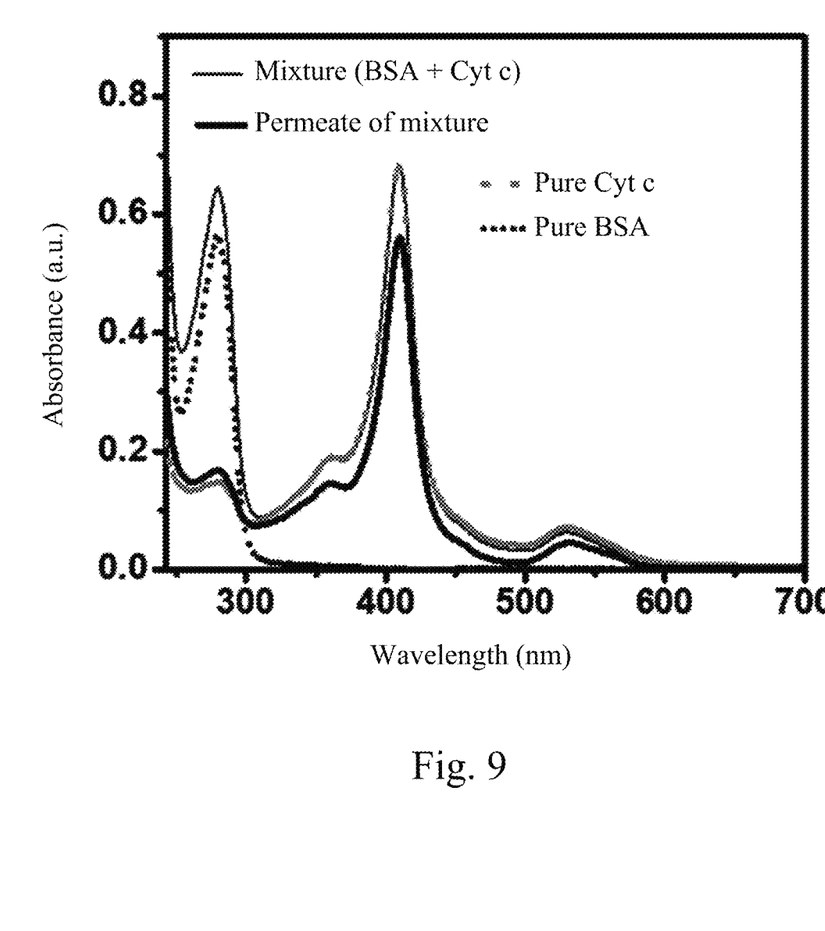
FIG. 9 shows UV-vis absorption spectra before and after filtering the mixture solution of Cyt c and BSA through the nanofilter device with MSTF-5.9⊥AAO as filter membrane.

To demonstrate mixed molecular separations with the MSTF AAO membranes, two common proteins with different molecular size, BSA (7 nm) and Cyt c (2 nm) are applied for mixed nanofiltration. FIG. 9 shows UV-vis absorption spectra before and after filtering the mixture solution of Cyt c and BSA through the nanofilter device with MSTF-5.9⊥AAO as filter membrane. The UV-vis spectra shows the characteristic peaks of BSA and Cyt c at 280 and 416 nm, respectively. The mesoporous silica thin membrane with a pore size of 5.9 nm (MSTF-5.91 AAO) was used as the nanofilter. After mixing, the UV-vis spectra show two characteristic peaks at 280 and 416 nm, which can be attributed to the BSA and Cyt c, respectively. After filtration by the mesoporous silica membrane nanofilter device, well-defined Cyt c peak at 416 nm can be obtained in the UV-vis spectra, where the characteristic peak of BSA almost completely disappears (the small peak at 280 nm was also attributed to the signal of Cyt c, as shown of the bare initial Cyt c solution). It can be calculated that more than 89.4% of Cyt c can pass the mesoporous silica membrane, while 99.9% of BSA are rejected. Since the membrane with a uniform pore size of 5.9 nm, when the molecular size is larger than the pore size of the MSTF⊥AAO membranes, they can be blocked. While small ones can easily pass through the MSTF⊥AAO membranes, making the size-selective separation and purification possible. These results confirm that the prepared MSTF-5.9⊥AAO can be used as an effective nanofilter for size selective filtration at the macroscale due to the centimeter scale size.

Base on this concept, this mesoporous matrix also can be applied for concentrate and separate Au nanoparticles in mixed solution, as well as the isolation of virus.

Example 7: Use of a Dual-Layer MSTF-2.2 AAO Membrane as a Filter for Dye Nanofiltration To demonstrate the high molecular-sieving ability of the MSTF-2.2 AAO membranes with pore diameter of 2.2 nm, nanofiltration of dyes was performed using the dead-end filtration device as mentioned above under the same permeation conditions. Seven different dye solutions (reactive red, evans blue, rose bengal, Congo red, rhodamine B safranin O, methylene blue) with concentrations of 80 mgL$^{-1}$ were chosen as feeds.

Figure 10:
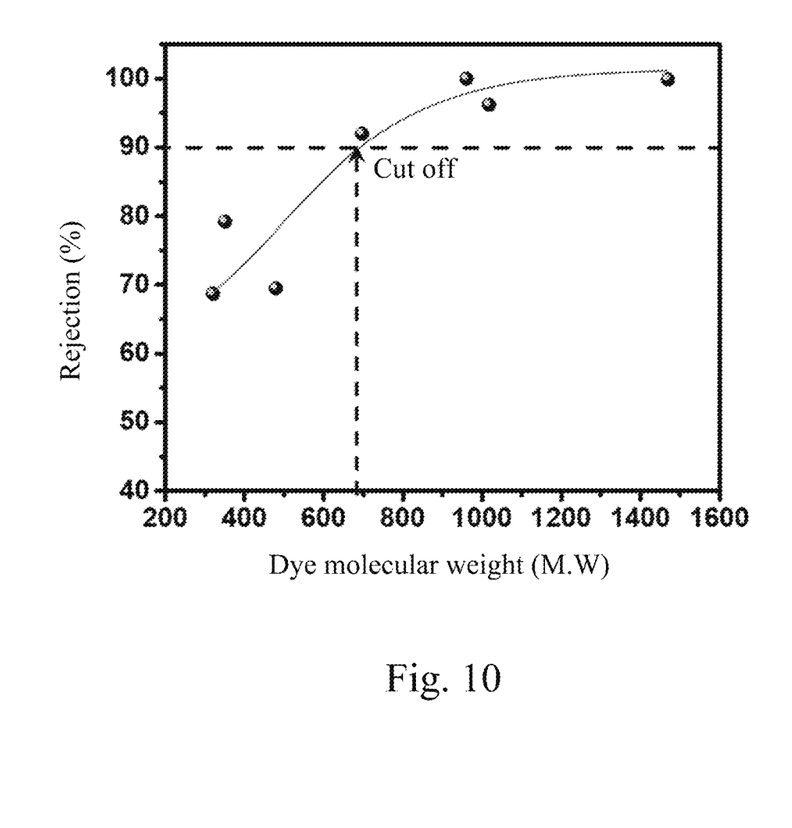
FIG. 10 shows the dye rejection by MSTF-2.2⊥AAO membrane as a function of dye molecular weight (M.W.).

FIG. 10 shows the dye rejection by MSTF-2.2⊥AAO membrane as a function of dye molecular weight (M.W.). The M.W. cut off is determined from the dashed lines shown (1 Da=1 g/mol). As shown in FIG. 10, the MSTF-2.2⊥AAO membrane can reject reactive red (Mw=1469), evans blue (Mw=960), rose bengal (Mw=1017) and Congo red (Mw=696.68) with rejection rates of 99.9%, 100%, 96.2% and 92.0%, respectively, and show poor rejection rates for smaller dyes, rhodamine B (69.5%) (Mw=479), safranin O (79.2%) (Mw=350), and methylene blue (68.7%) (Mw=320). The molecular weight cutoff (MWCO) of MSTF-2.2⊥AAO was determined to be about 690 Da for 90% dye rejection. These results confirm that the prepared MSTF-2.2⊥AAO membrane can be used as an effective selective nanofilter for dye nanofiltration at the macroscale due to its uniform periodic vertical mesoporous channels and centimeter size.

Based on the above, the present disclosure provides a porous membrane including a macroporous substrate and a mesoporous silica thin film (MSTF) with perpendicular mesopore channels, wherein the MSTF is positioned on the macroporous substrate. The porous membrane can be applied for filtration, such as nanofiltration or ultrafiltration. The present disclosure provides a method for filtering a fluid including particles by using the porous membrane as a filter. The porous membrane has excellent size exclusion ability and high molecular-sieving ability.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A method of fabricating a porous membrane, the method comprising:
   (i) growing a mesoporous silica thin film with perpendicular mesopore channels on a polymer film, wherein the polymer film comprises polyvinylidene fluoride (PVDF);
   (ii) after growing the mesoporous silica thin film, transferring the mesoporous silica thin film and the polymer film onto a macroporous substrate, wherein the polymer film is positioned between the macroporous substrate and the mesoporous silica thin film; and
   (iii) removing the polymer film to form the porous membrane.

2. The method of claim 1, wherein the polymer film is removed by N-methyl-pyrrolidone (NMP) and an ozone clean.

3. The method of claim 1, further comprising:
   before growing the mesoporous silica thin film, spin coating a PVDF solution on a glass sheet; and
   evaporating a solvent in the PVDF solution to form the polymer film.

4. The method of claim 1, wherein growing the mesoporous silica thin film with the perpendicular mesopore channels on the polymer film comprises:

immersing the polymer film into an ammonia solution, wherein the ammonia solution comprises a tertiary alkyl ammonium halide, ammonium hydroxide, alcohol, and a pore expending agent;

introducing a silica precursor into the ammonia solution; and performing a heating step to form the mesoporous silica thin film on the polymer film.

5. The method of claim 4, wherein the pore expending agent is selected from the group consisting of decane, ethyl acetate, hexadecane, silane polyethylene glycol, pentyl ether, and a combination thereof.

6. The method of claim 4, wherein the silica precursor comprises tetraethyl orthosilicate, fumed silica, zeolite beta seeds, or a combination thereof.

7. The method of claim 4, wherein the tertiary alkyl ammonium halide is cetyltrimethylammonium bromide (CTAB).

8. The method of claim 4, wherein the heating step is performed at a temperature between about 35° C. and about 80° C.

9. The method of claim 1, wherein the macroporous substrate has macropores, and the macropores have an average pore diameter of more than or equal to about 20 nm, and less than or equal to about 1 μm.

10. The method of claim 1, wherein the mesoporous silica thin film has an area of more than or equal to about 0.5 cm$^2$, and less than or equal to about 100 cm$^2$.

11. The method of claim 1, wherein each mesopore channel of the mesoporous silica thin film has a pore size of more than or equal to about 2 nm, and less than or equal to about 10 nm.

12. A method of fabricating a porous membrane, the method comprising:

(i) forming a polymer film on a macroporous substrate, wherein the polymer film comprises crosslinked polymers comprising cross-linked polystyrene (PS), cross-linked polymethyl methacrylate (PMMA), or a combination thereof;

(ii) growing a mesoporous silica thin film with perpendicular mesopore channels on the polymer film; and (iii) removing the polymer film to form the porous membrane.

13. The method of claim 12, wherein forming the polymer film on the macroporous substrate comprises:

coating a solution comprises polymers and a photoinitiator on the macroporous substrate, wherein the polymers comprise polystyrene (PS), polymethyl methacrylate (PMMA), or a combination thereof; and irradiating the solution with UV light to form the cross-linked polymers to form the polymer film.

14. The method of claim 12, wherein the polymer film is removed by a heat treatment and an ozone clean.

15. The method of claim 14, wherein the heating treatment is performed at a temperature between about 300° C. and about 500° C.

16. The method of claim 12, wherein the macroporous substrate has macropores, and the macropores have an average pore diameter of more than or equal to about 20 nm, and less than or equal to about 1 μm.

17. The method of claim 12, wherein the mesoporous silica thin film has an area of more than or equal to about 0.5 cm$^2$, and less than or equal to about 100 cm$^2$.

18. The method of claim 12, wherein the mesoporous silica thin film has a thickness of more than or equal to about 10 nm, and less than or equal to about 100 nm.

19. The method of claim 12, wherein each mesopore channel of the mesoporous silica thin film has a pore size of more than or equal to about 2 nm, and less than or equal to about 10 nm.

* * * * *